(12) United States Patent
Rothman et al.

(10) Patent No.: US 7,373,537 B2
(45) Date of Patent: May 13, 2008

(54) RESPONSE TO WAKE EVENT WHILE A SYSTEM IS IN REDUCED POWER CONSUMPTION STATE

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 11/170,632

(22) Filed: Jun. 28, 2005

(65) Prior Publication Data
US 2006/0294407 A1    Dec. 28, 2006

(51) Int. Cl.
*G06F 9/48*    (2006.01)
*G06F 1/32*    (2006.01)

(52) U.S. Cl. .............................. 713/323; 713/1; 713/2; 713/300; 713/310; 713/320; 713/321; 713/322; 713/324; 713/330; 713/340

(58) Field of Classification Search ................... 713/1, 713/2, 300, 310, 320–324, 330, 340
See application file for complete search history.

(56) References Cited

U.S. PATENT DOCUMENTS

| 5,220,671 | A | * | 6/1993 | Yamagishi | 713/324 |
| 6,963,987 | B1 | * | 11/2005 | Emons | 713/324 |
| 7,137,017 | B2 | * | 11/2006 | Itoh | 713/322 |
| 7,222,253 | B2 | * | 5/2007 | Samson et al. | 713/323 |
| 2005/0044453 | A1 | | 2/2005 | Dunstan et al. | |
| 2006/0136756 | A1 | | 6/2006 | Rothman et al. | |
| 2006/0230280 | A1 | | 10/2006 | Zimmer et al. | |

* cited by examiner

*Primary Examiner*—Abdelmoniem Elamin
(74) *Attorney, Agent, or Firm*—Schwabe, Williamson & Wyatt, P.C.

(57) ABSTRACT

An apparatus adapted to facilitate execution of task or tasks in response to a detection of an occurrence of one of one or more particular wake events while a system is in a reduced power consumption state, with the system remaining in the reduced power consumption state during the execution of the task, is described herein.

22 Claims, 4 Drawing Sheets

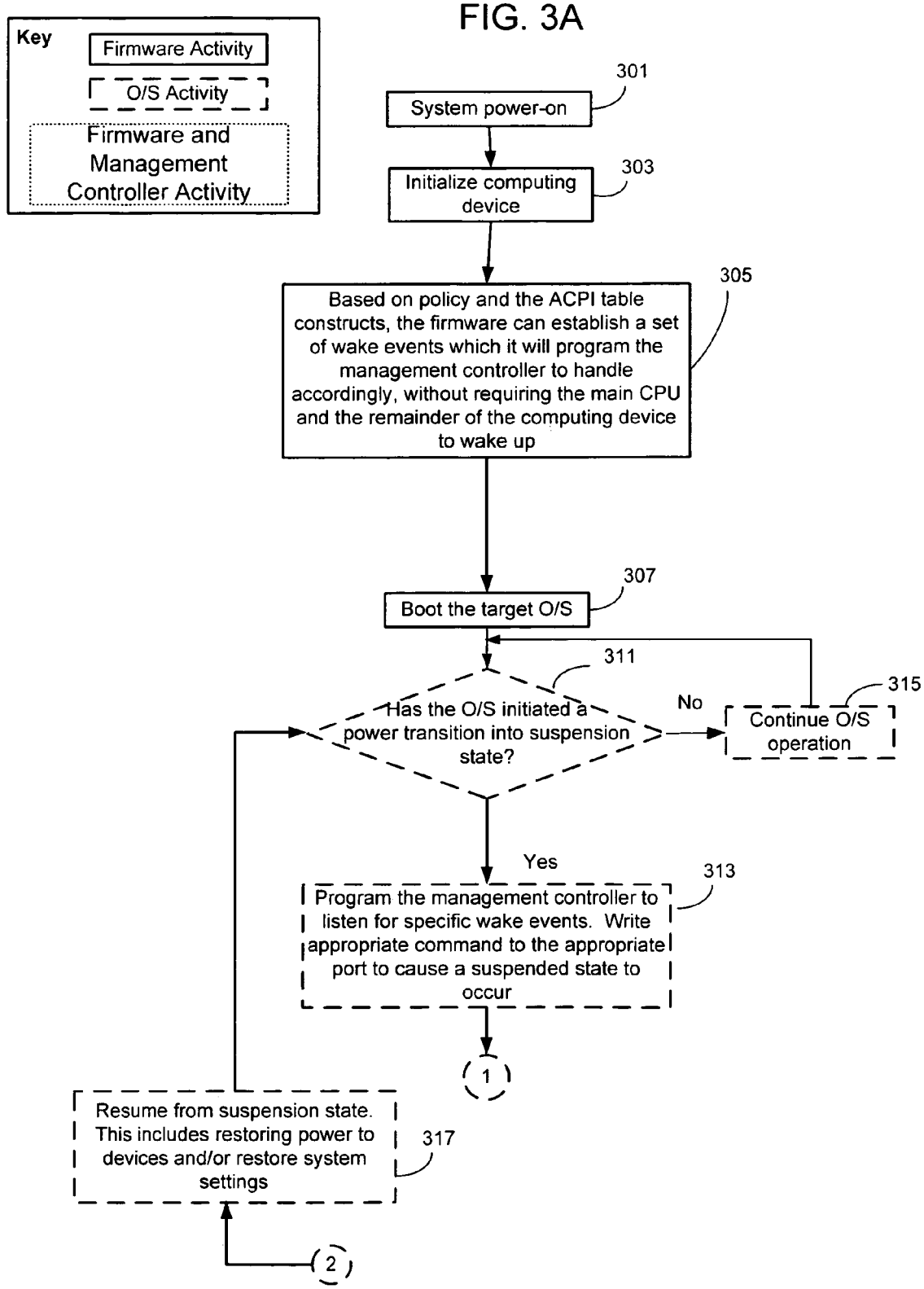

RESPONSE TO WAKE EVENT WHILE A SYSTEM IS IN REDUCED POWER CONSUMPTION STATE

TECHNICAL FIELD

Embodiments of the present invention relate generally to computing devices and, more specifically, to handling of wake events while a computing device is in a reduced power consumption state.

BACKGROUND INFORMATION

Various mechanisms exist for reducing power consumption of computing devices. Standard technology for power management is specified in, for example, Advanced Configuration and Power Interface (ACPI) version 2.0, published Jul. 27, 2000, (jointly developed by Hewlett-Packard, Intel, et al.). ACPI is the standard most computer systems currently use for power management and is used to describe how the system looks to the operating system. Power management capabilities enable a computing device, both at component and system level, to change its operating state to use less power and to resume normal operations. These modes of operation, for purposes of this description, will be called suspended and active states. A number of events (herein "sleep" events) may trigger a computing device to transition from an active higher power consumption state to an inactive lower power consumption state, while a number of other events (herein "wake" events) may trigger a computing device to transition from an inactive low power consumption state to a more active higher power consumption state. For instance, a sleep event may trigger a computing device to go into a suspended state. Such sleep events may be as a result of perhaps due to time, inactivity, or user selection. When a computing device goes into a suspended state, many of the device components (e.g., main processor such as the central processing unit (CPU), volatile memory, disk drives for mass storage, and so forth) may be placed into a non-functional or sleep mode. On the other hand, a wake event may occur when moving a mouse, pressing a key on the keyboard, receiving a message, or receiving a query from a remote system administrator may cause a computing device to transition to an active state from a sleep, or low-power, state.

Conventionally, computing devices must be in an active state to handle a wake event. This means that many or all of the device components must be functional or operational in order to handle the wake event.

BRIEF DESCRIPTION OF THE DRAWINGS

The present invention will be described by way of exemplary embodiments, but not limitations, illustrated in the accompanying drawings in which like references denote similar elements, and in which:

FIGS. 3A and 3B illustrate an exemplary flow process that includes execution of a task in response to a wake event by a management controller in accordance with some embodiments.

DETAILED DESCRIPTION OF ILLUSTRATIVE EMBODIMENTS

Illustrative embodiments of the present invention include but are not limited to methods for executing tasks in response to wake events in computing devices while the devices are in a reduced power consumption state, components contributing to the practice of these methods, in part or in whole, and devices endowed with such components.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising", "having", and "including" are synonymous, unless the context dictates otherwise.

Figure 1:
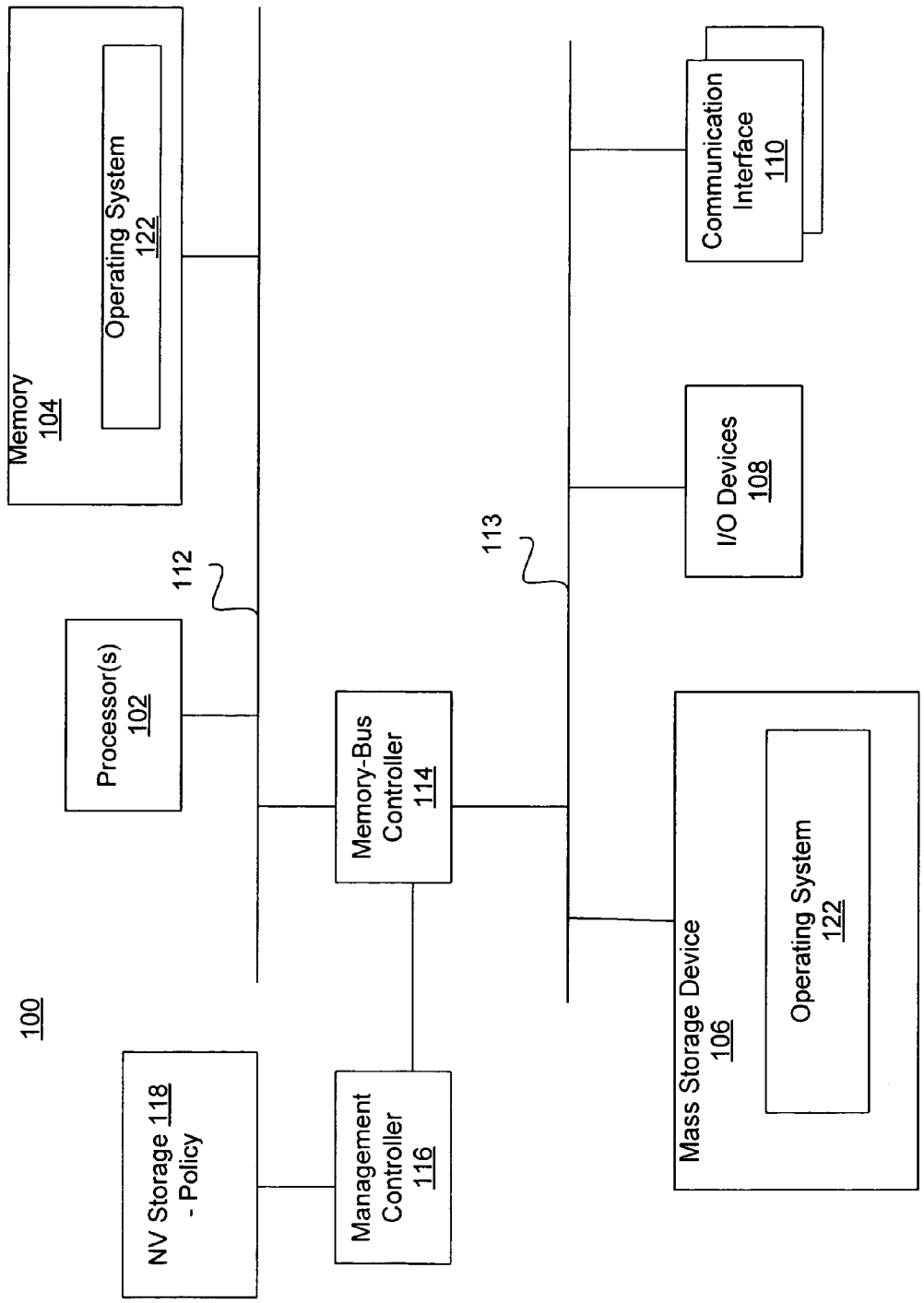
FIG. 1 illustrates an overview of the invention, in accordance with various embodiments.

Referring now to FIG. 1, wherein an overview of the present invention, in accordance with various embodiments, is shown. As illustrated, for the embodiments, computing device 100 includes processor(s) 102, memory 104, memory-bus controller 114, and buses 112 and 113, coupled to each other as shown. Additionally, computing device 100 includes mass storage device 106, input/output (I/O) devices 108, and communication interfaces 110 coupled to each other, and the earlier described elements as shown.

Memory 104 and mass storage device 106 include, in particular, temporal and persistent copies of operating system 122, respectively. In various embodiments, I/O devices 108 may include output devices, such as a monitor, for locally outputting data, and input devices, such as a keyboard or a mouse, for locally inputting data. The communication interfaces 110 may include a networking interface such as a network interface card (NIC) coupling computing device 100 to a network, to facilitate reception of data such as e-mails, configuration directives and queries from, for example, a remote administrator, application patches, and so forth.

In various embodiments, operating system 122 is adapted to operate computing device 100 in one or more operational states, including one or more reduced power consumption states, wherein one or more of processor 102, memory 104, and so forth, may be placed in a reduced power consumption state, including a power-off state. Various events, when occurred while the system is in one of the reduced power consumption state, may be considered wake events of the system. Examples of these may include an attempt by a user to input via an input device while the system is in a reduced power consumption state, or the receipt of a data transmission by communication interface 110 while the system is in a reduced power consumption state.

Further, computing device 100 is endowed with management controller 116 and nonvolatile storage 118, coupled to each other and the earlier described elements as shown. For the embodiments, nonvolatile storage 118 includes one or more policy information specifying handling of various wake events, including handling of various wake events while computing device 100 remains in a reduced power consumption state. In various embodiments, the handling of the various wake events may include execution of one or more tasks with computing device 100 remaining in a reduced power consumption state. In various embodiments, non-volatile storage 118 may include these tasks for implementing the policies therein. Alternatively, the tasks for implementing the policies, and optionally including even the policies may be integrated into the management controller 116.

As will be described in more detail below, management controller 116 is adapted to execute one or more tasks for computing device 100 in response to a detection of an occurrence of a wake event while the computing device 100 is in a reduced power consumption state, thereby handling the wake events without causing the computing device 100 to come out of the reduced power consumption state. The management controller 116 may execute the task or tasks, in some embodiments, independent of the operating system 122 and/or the processor(s) 102, that is, irrespective of their availability or operational state. More specifically, for the embodiments, management controller 116 is adapted to use the data/information stored in nonvolatile storage 118, in handling the wake events while the computing device 100 is in a suspended state. Recall in the prior art, a wake event would normally require a conventional computing device to return to a higher power consumption state, rather than remaining in a lower power consumption state, to handle the wake event.

In various embodiments, management controller 116 includes an input/output (I/O) interface (not shown) for interfacing with memory-bus controller 114, enabling it, among other things, to be operatively coupled to processor 102, communication interfaces 110, and so forth. In other embodiments, management controller 116 may be coupled to processor 102 and/or communication interfaces 110 directly, without going through memory-bus controller 114. Although the management controller 116 is depicted as being a discrete component relative to the memory-bus controller 114, in other embodiments, management controller 116 may be integrated with memory-bus controller 114 and/or other components.

As will be described in more detail below, management controller 116 is adapted to execute one or more tasks in response to a detection of an occurrence of one or one or more particular wake events while the computing device is in a reduced power consumption state without waking all or most of the other components (e.g., processor(s) 102 and memory 104) or only waking up selective components.

The nonvolatile storage 118, in some instances, may be flash memory. The policy or policies may be stored in the nonvolatile storage 118 by the computing device's firmware, e.g., basic input/output system (BIOS). The policy or policies (herein "policy") may identify at least the wake event or events to be handled by the management controller 116. The policy may further define the task or tasks (herein "task") that need to be executed for each wake event identified in the policy. The task to be performed in response to a wake event may call for all or most of the device components to be awakened, selective device component(s) to be awakened, or none of the device components to be awakened. Similarly, the task may be stored into nonvolatile storage 118 by the computing device's firmware, e.g. the BIOS. Because the nonvolatile storage 118 contains the policy and the logic to implement the policy, the management controller 116 can determine and execute a task in response to a detected occurrence of a wake event without the operating system (OS) 122 or the processor(s) 102 in a functional status. That is, the management controller 116, in various embodiments, may be a component that may operate independently from the processor(s) 102 and/or the OS 122.

Except for the management controller 116, and the data/information and/or instructions stored in nonvolatile storage 118, each of the earlier described elements represents a broad range of the corresponding elements known in the art or to be designed consistent with the teachings of the present invention. They perform their conventional functions, i.e. processing, storage, and so forth. For example, OS 122 is adapted to perform its conventional function of managing the resources of computing device 100.

In various embodiments, computing device 100 may have more or less elements, and/or different architectures. In various embodiments, computing device 100 may be a desktop computer, a tablet computer, a palm-sized computing device, a set-top box, or a media player (e.g., a CD or DVD player).

Figure 2:
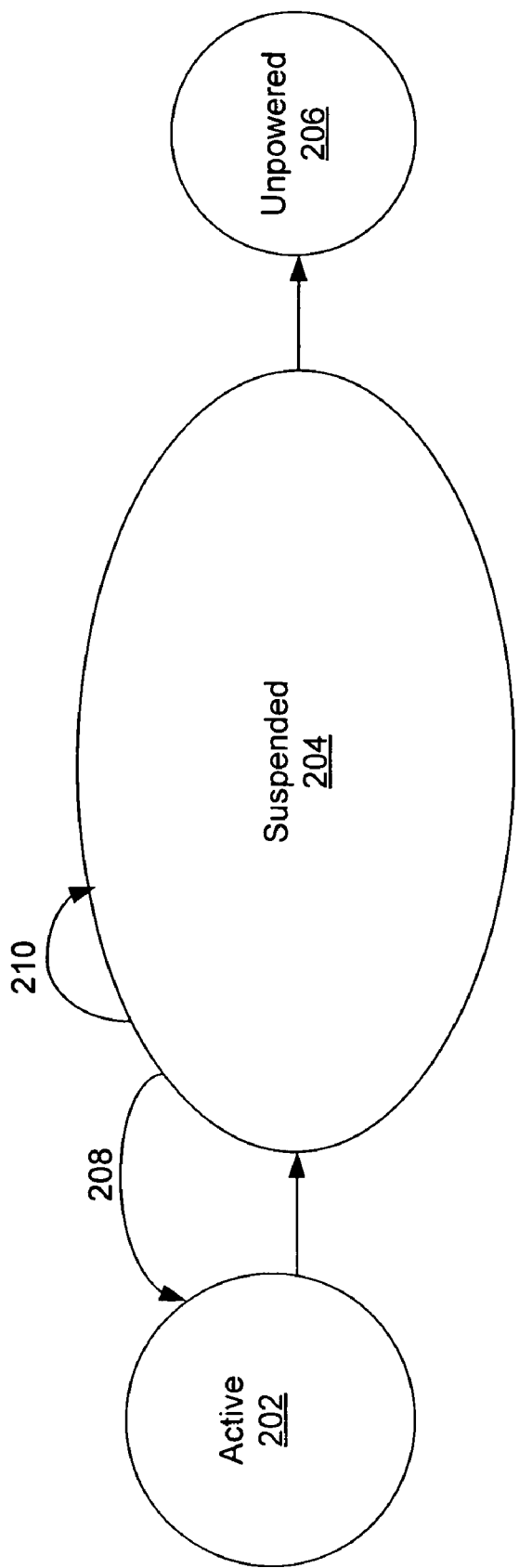
FIG. 2 illustrates the three ACPI operational states of the system of FIG. 1, in accordance with some embodiments.

FIG. 2 illustrates one embodiment of the operational states of computing device 100. For ease of understanding, the operational states will be described assuming computing device 100 also includes implementation of ACPI, and mapped to the ACPI states. For the embodiment, the operational states of computing device 100 includes three major operational states, active state (e.g., ACPI S0) 202, suspended state (e.g., ACPI S1 to S4) 204 and unpowered state (i.e., ACPI G3) 206. However, alternate embodiments may be practiced without mapping to ACPI states or implementation of ACPI. For further information these ACPI states, see ACPI Specification, Revision 2.0b.

In terms of power consumption, the active state 202 represents the highest or near highest power consumption states of the computing device 100, the unpowered state 206 represents the lowest power consumption state (i.e., unplugged device), and the suspended state 204 represents various power consumption states between the active and unpowered states 202 and 206. Within the active state 202, the computing device 100 may be fully or nearly fully powered. For example, in the active state 202, all or vast majority of the system components such as the processor(s) 102, the memory 104, disk drive(s), and other devices, may be fully or nearly fully powered and the computing device 100 is at or near maximum power consumption. Note, however, that the computing device 100 may still be in the active state 202 if a selected one or more of the device components such as a monitor is nonfunctional. In the suspended state 204, many of the device components such as processor(s) 102, memory 104, memory storage device 106 including disk drives, I/O devices 108 such as a monitor, and other components may be non-functional. As defined here, the term "non-functional" may be broadly defined such that a non-functional component may be consuming some low level of power or no power at all. Within the suspended state 204, there may be different states of power consumption depending upon whether, if at all, selected device components are functional or running. Current ACPI standards do not particularly address different power consumption levels within, for example, the suspended state 204. Thus within the suspended state 204, such as ACPI S3 state, there may be different levels of power consumption. Further, in the unpowered state 206, the computing device 100 is not powered or, in essence, unplugged. Thus, although FIG. 2 depicts three major operational states, in actuality, there may be many more different power consumption states than the three major operational states depicted.

According to various embodiments, once a wake event occurs while the computing device 100 is in a suspended state 204, the computing device 100 may be transitioned into the active state 202 as depicted by 208, or the wake event can be handled entirely within the suspended state 204 as indicated by 210. For instance, when a wake event occurs, the management controller 116 may make the determination as to which task needs to be executed in response to the wake event. The task that needs to be executed may require that the computing device 100 be in the active state 202 or high power consumption state where most or all of the device components are running, or require selected additional device components to be running, in which case the computing device 100 goes into a higher power consumption state but still within the suspended state 204, or require no additional device components to be running in which case the computing device 100 stays at the same power consumption state but still within the suspended state 204. In any event, when the task is executed, the computer device 100 may or may not be at a higher power consumption state and may or may not remain in the suspended state 204.

Wake events, in some embodiments, may originate from an I/O device 108 or a network via a communication interface 110 such as a network interface card (NIC). At least three types of wake events can be identified, those that require tasks that need all or most device components to be running in order to execute the tasks, those that require tasks that need only one or few device components to be running in order to execute the tasks, and those that require tasks that need no device components to be running in order to execute the tasks. Examples of wake events include receipt of e-mail, receipt of other messages or network transmission, remote system administrator queries, application patches, mouse movement, keyboard activity, periodic wake, and so forth.

Figure 3B:
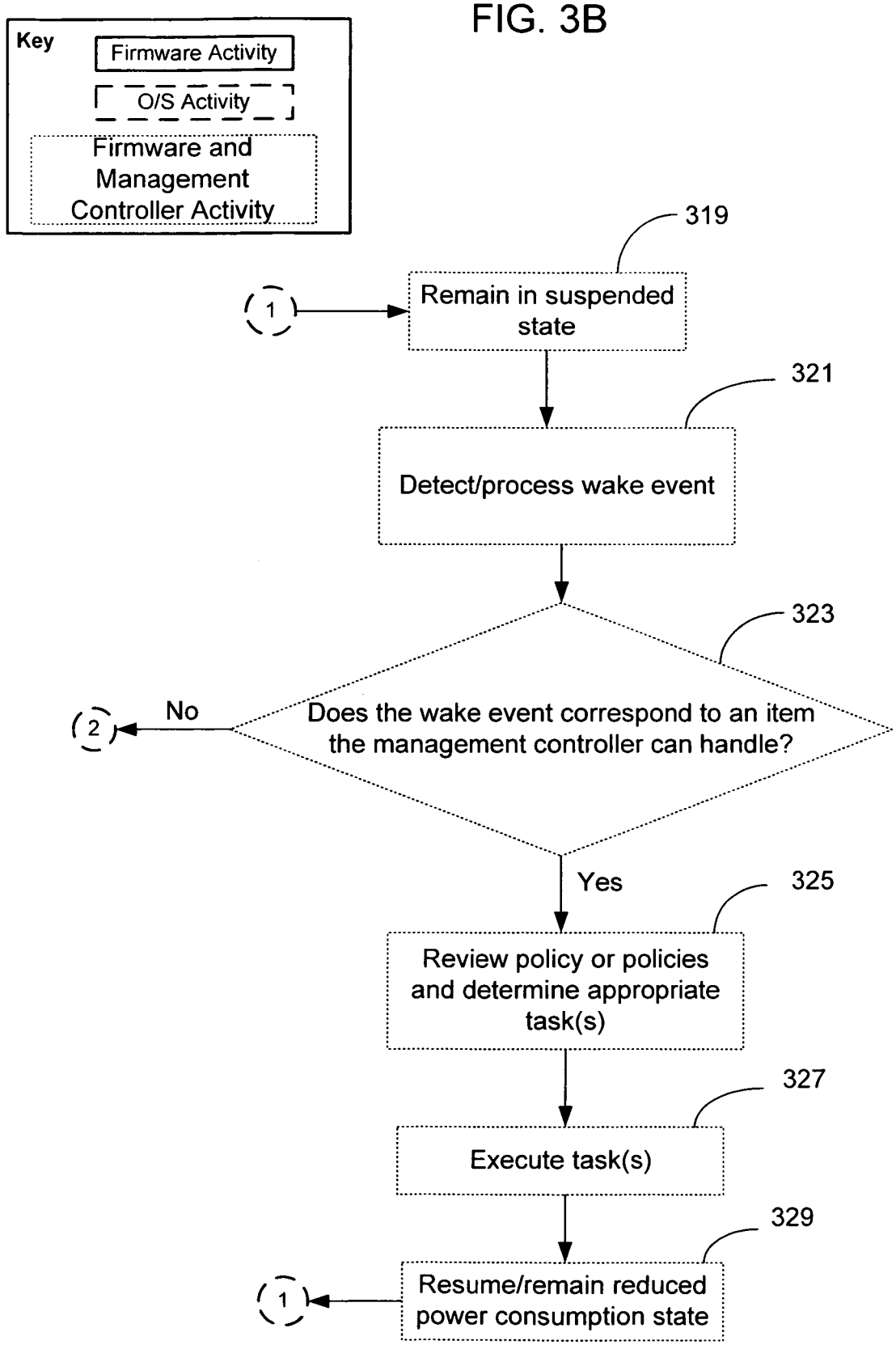

FIGS. 3A and 3B depict an exemplary process that includes execution of a task by a management controller in response to a wake event during a suspended state in accordance with some embodiments. The task may be executed without waking the main processor(s) and/or independent of the operating system (OS). In these figures, blocks outlined by a solid line may be performed by the system firmware, in particular, the basic input/output system or BIOS. Note that in addition to the BIOS, the computing device may also include wake policy or policies and, in some instances, logic for executing the policy or policies. Blocks outlined with large broken lines may be performed by the OS and the main processor(s). Blocks outlined by dots may be performed by the management controller and system firmware without the processor(s) and/or the OS. It will be apparent to one of ordinary skill in the art that the term "performed by the firmware" is shorthand for a more complex computing device interaction. For instance, in a typical single processor system, instruction execution may be performed by the main processor, or CPU, involving executions of multiple tasks.

The main processor(s) 102 may have access to the firmware prior to loading the OS. Thus, boot instructions are typically stored in the firmware boot block. In some embodiments, the boot block resides remotely, and the "boot block" contains a pointer to the remote location. Note again that policy or policies (herein "policy") and, in some instances, logic for executing the policy may also be included in the firmware. Further, when the computing device is in a low power consumption state, the main processor(s) may be essentially or completely shut down and the OS nonfunctional. Wake events that occur during low or reduced power consumption state, in various embodiments, may trigger the management controller to execute task or tasks based, at least in part, on the wake policy (or simply "policy").

Referring now to FIG. 3A, a computing device or system implemented with an embodiment of the present invention is powered at block 301. The computer device is initialized by the boot block firmware in block 303. Other portions of the firmware, residing outside of the boot block, may play a role in initialization. The boot block may be responsible for early aspects of initialization such as early memory initialization and central processor initialization. Initialization may include identifying and resetting memory, identifying devices and components coupled to the computing device, and so forth.

In various embodiments, based on policy included in the firmware and ACPI table constructs, the firmware may establish a set of wake events to be handled accordingly by the management controller rather than the main processor at block 305 (i.e. programming the management controller). The policy may be standard and shipped with the computing device, or may be determined by a system administrator or the like. Policy may be stored in a computing device's nonvolatile memory, for instance, flash memory. Wake events may be programmed by the firmware into the computing device's management controller. As described previously, events such as touching the keyboard, receiving a network packet of a certain type, and so forth could be programmed as wake events.

Wake events may be initiated by system management interrupts (SMIs), control line changes, register flags, or other constructs. In other cases, wake events may be initiated by the memory-bus controller (i.e., memory controller hub-input/output controller hub (MCH/ICH) conventionally known as north and south bridges) and cause an SMI. Some wake events may require that in order to properly handle the wake events the computing device is in an active state or high power consumption state, in which case the main processor (i.e., CPU) and/or the OS is made operational. Other wake events may be handled by the management controller and the firmware without the main processor and/or OS operational and while the computing device is still in a suspended state.

Once the wake events have been set, the firmware boots the OS at block 307. Normal operation of the computing device commences, under control of the OS. The OS continues normal operation until an SMI, or other event, has occurred. If an SMI has occurred, then a determination is made at block 311 whether the OS has initiated a power transition to a lower power consumption state such as suspended state.

If the OS has not initiated a transition to the suspended state, then OS operation continues as normal in block 315. If, on the other hand, the OS has initiated a suspension state transition, or transition to a reduced power consumption state, as determined at block 311, the appropriate command may then be written, for example, to a port to cause the transition at block 313. Power level transitioning may be defined by ACPI standards. The computing device may then remain in a suspended or reduced power consumption state with, in some instances, the main processor(s) and/or the OS nonoperational or nonfunctional at block 319 in FIG. 3B. In some embodiments, block 319 represents the state in which the computing device is in a wait-loop, in which case the management controller is waiting for an alert or a wake event to occur.

When a wake event is detected, it is processed at block 321. A determination is made by the management controller based on the policy information whether the wake event corresponds to an event that the management controller can handle without waking all or most of computing device at block 323. If the event cannot be handled by the management controller without waking up the computing device, then the computing device resumes from the reduced power consumption state (e.g., suspended state) to an active state in block 317 (see FIG. 3A). This may include restoring power to most or all of the components of the computing device and/or restore system settings. The wake event may then be handled by the OS as a Common General Purpose Event. Normal OS polling of devices may ensue, e.g., retrieve e-mail, etc. Again, as previously described, a determination is then made as to whether the OS has initiated a power transition to sleep mode at block 311. Depending on the type of wake event received, the computing device may immediately transition back to a suspended state, or remain in active state, for instance, if the event was a keyboard event.

Returning to FIG. 3B, if the policy indicates that the management controller is to handle the event at block 323, then the event is handled by the management controller without waking the entire computing device. Based on the policy, a determination is made as to the appropriate task to be executed at block 325. In some embodiments, selected device component or components may be required to be powered up or functional in order to execute the task thus resulting in the computing device transitioning into a higher power consumption state, but the computing device is not brought to full active state. The task is then executed at block 327 using, if the task calls for it, selected device component or components. This means that selected device component or components are made functional before executing the task. Once the wake event has been handled (i.e., executing one or more tasks), the computing device may transition back into a reduced power consumption state if the computing device had to transition into higher power consumption state in order to execute the task or maintain the reduced power consumption state if no device components were activated in order to perform the task at block 329. In the case where the computing device is transitioned back into a reduced power consumption state, this may mean shutting down the device components or components that were powered up to handle the wake event. The computing device will then stay in the reduced power consumption state and may loop back to block 319 at least until another wake event has been detected at which time the process depicted in FIG. 3B repeats itself.

Accordingly, management controller 116 is able to execute a task in response to a wake event while the computing device 100 is in a reduced power consumptions state. The execution of the task, in some instances, may mean that selected components be made functional resulting in the computing device 100 transitioning into a higher power consumption state in order to execute the task but without transitioning the computing device 100 from a suspended state 204 to an active state 202.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. An apparatus, comprising:
  a task to be executed after an occurrence of one or more particular wake events while a system is in a reduced power consumption state, the system having a processor, a storage device and a memory coupled to the processor, a persistent copy of an operating system stored in the storage device, a temporal copy of at least a part of the operating system stored in the memory, and the system having a plurality of operational states including the reduced power consumption state; and
  a controller operatively coupled to the task, and adapted to execute the task independent of both the persistent and the temporal copies of the operating system in response to a detection of an occurrence of one of the particular wake events while the system is in the reduced power consumption state, with the system remaining in the reduced power consumption state during the execution of the task.

2. The apparatus of claim 1, wherein the memory is powered off while the system is in the reduced power consumption state and during the execution of the task.

3. The apparatus of claim 1, wherein the controller is adapted to determine whether to execute a task in response to the detection of an occurrence of one of the particular wake events in accordance with one or more policies that is or independent of the operating system and the temporal copy of the operating system.

4. The apparatus of claim 3, wherein the system further comprises the one or more policies, and the controller is further adapted to examine the one or more policies on detection of an occurrence of one of the particular events.

5. The apparatus of claim 4, wherein the apparatus further comprises another storage device, the one or more policies are stored in the other storage device of the apparatus, and the controller is further adapted to retrieve the one or more policies from the other storage device having the one or more policies.

6. The apparatus of claim 5, further comprising a basic input/output system (BIOS), and said one or more policies is or are stored in the other storage device by the BIOS.

7. The apparatus of claim 5, wherein the other storage device is a non-volatile flash memory device.

8. The apparatus of claim 1, wherein the apparatus further comprises another task to be executed on an occurrence of one or more other particular wake events, and the controller is further adapted to cause the system to transition from the reduced power consumption state to a higher power consumption state, after the controller determines that the controller is to cause the system to transition from the reduced power consumption state to a higher power consumption state based on detection of the occurrence of the one or more other particular wake events.

9. The apparatus of claim 1, wherein the storage device and the processor of the system are powered off while the system is in the reduced power consumption state, and power is provided to both the storage device and the processor of the system while the system is in a higher power consumption state.

10. The apparatus of claim 1, wherein the storage device and the processor of the system are powered off while the system is in the reduced power consumption state.

11. The apparatus of claim 1, wherein the system further comprises a memory-bus controller to which the storage device and the processor of the system are coupled, wherein the apparatus is a discrete component coupled to the memory-bus controller.

12. The apparatus of claim 1, wherein the system further comprises a memory-bus controller to which the storage device and the processor are coupled, and the apparatus is integrated within the memory-bus controller.

13. The apparatus of claim 1, wherein the one or more particular wake events comprise a local wake event of the system.

14. The apparatus of claim 1, wherein the one or more particular wake events comprises a remote wake event of the system.

15. A system comprising:
a keyboard;
a storage device having a persistent copy of an operating system stored therein;
a memory to store a temporal copy of at least a part of the operating system;
a processor coupled to the keyboard and the storage device; and
a controller having coupled to the processor and the storage device, and adapted to execute a task independent of both the persistent and the temporal copies of the operating system in response to a detection of an occurrence of one of one or more particular wake events of the system while the system is in a reduced power consumption state, with the system remaining in the reduced power consumption state.

16. The system of claim 15, wherein the memory is powered off while the system is the reduced power consumption state and during the execution of the task.

17. The system of claim 15, wherein the system further comprises a memory-bus controller to which the storage and the processor are coupled, integrally comprising the controller.

18. A method, comprising:
a controller of a system having a processor, a storage device coupled to the processor, a persistent copy of an operating system disposed in the storage device, and a memory to store a temporal copy at least a part of the operating system, detecting for an occurrence of one of one or more particular wake events of the system, while the system is in a reduced power consumption state; and the controller executing a task independent of both the persistent and the temporal copies of the operating system in response to a detection of an occurrence of one of the particular wake events, with the system remaining in the reduced power consumption state.

19. The method of claim 18, wherein the memory is powered off while the system is in the reduced power consumption state and during the execution of the task.

20. The method of clam 1, wherein the controller further determining whether to execute a task in response to a detection of an occurrence of one of the particular wake events in accordance with one or more policies that is or are independent of the operating system and the temporal copy of the operating system.

21. An article of manufacture, comprising:
a storage medium; and
a plurality of instructions stored in the storage medium, adapted to enable a controller of a system having in addition to the controller, a processor, a storage device coupled to the processor, a persistent copy of an operating system stored in the storage device, and a memory to store a temporal copy of at least a part of the operating system, to execute a task independent of both the persistent and the temporal copies of the operating system in response to a detection of an occurrence of one of one or more particular wake events of the system while the system is in a reduced power consumption state, with the system remaining in the reduced power consumption state during the execution of the task.

22. The article of claim 21, wherein the instructions are further adapted to enable the controller to power off the memory while the system is in the reduced power consumption state and during the execution of the task.

* * * * *

UNITED STATES PATENT AND TRADEMARK OFFICE
CERTIFICATE OF CORRECTION

| | | |
|---|---|---|
| PATENT NO. | : 7,373,537 B2 | Page 1 of 1 |
| APPLICATION NO. | : 11/170632 | |
| DATED | : May 13, 2008 | |
| INVENTOR(S) | : Rothman et al. | |

It is certified that error appears in the above-identified patent and that said Letters Patent is hereby corrected as shown below:

Column 9

Line 31, "...of one of one or more..." should read --...of one or more...--.

Column 10

Line 3-4, "...of one of one or more..." should read --...of one or more...--.

Signed and Sealed this

Second Day of September, 2008

JON W. DUDAS
*Director of the United States Patent and Trademark Office*